United States Patent [19]

Heinig, Jr.

[11] Patent Number: 5,352,369
[45] Date of Patent: Oct. 4, 1994

[54] METHOD OF TREATING WATER

[75] Inventor: Charles F. Heinig, Jr., Providence, R.I.

[73] Assignee: Fountainhead Technologies, Inc., Providence, R.I.

[21] Appl. No.: 40,454

[22] Filed: Apr. 1, 1993

[51] Int. Cl.⁵ .................... C02F 1/50; C02F 1/78
[52] U.S. Cl. .................... 210/760; 210/763; 210/764; 210/501; 210/758
[58] Field of Search ........... 210/760, 763, 762, 916, 210/917, 501; 422/28; 252/432

[56] References Cited

U.S. PATENT DOCUMENTS

| | | | |
|---|---|---|---|
| 3,268,444 | 8/1966 | Renn | 210/764 |
| 3,433,580 | 3/1969 | Deuringer | 423/219 |
| 3,702,298 | 11/1972 | Zsoldos et al. | 210/754 |
| 3,788,982 | 1/1974 | Zsoldos, Jr. et al. | 210/24 |
| 3,883,442 | 5/1975 | McArthur | 252/432 |
| 3,912,626 | 10/1975 | Ely et al. | 210/724 |
| 3,963,645 | 6/1976 | Gelbein | 252/455 R |
| 4,007,118 | 2/1977 | Ciambrone | 210/760 |
| 4,029,578 | 6/1977 | Turk | 210/760 |
| 4,040,982 | 8/1977 | Basila et al. | 210/760 |
| 4,092,245 | 5/1978 | Franks et al. | 210/501 |
| 4,116,859 | 9/1978 | Merkl | 252/186 |
| 4,198,296 | 4/1980 | Doumas et al. | 210/501 |
| 4,379,778 | 4/1983 | Dalton, Jr. et al. | 423/584 |
| 4,393,038 | 7/1983 | Sun et al. | 423/584 |
| 4,396,512 | 8/1983 | Beauman et al. | 210/668 |
| 4,407,865 | 10/1983 | Nice | 427/217 |
| 4,608,247 | 8/1986 | Heinig, Jr. | 210/501 |
| 4,751,005 | 6/1988 | Mitui et al. | 210/759 |
| 4,784,765 | 11/1988 | Cohen | 210/169 |
| 5,011,602 | 4/1991 | Totani et al. | 210/484 |
| 5,130,033 | 7/1992 | Thornhill | 210/754 |
| 5,145,587 | 9/1992 | Ishii et al. | 210/759 |
| 5,178,768 | 1/1993 | White, Jr. | 210/663 |
| 5,192,452 | 3/1993 | Mitsui et al. | 210/760 |

FOREIGN PATENT DOCUMENTS 401258792  10/1988  Japan ........................ 210/764

*Primary Examiner*—Cynthia L. Nessler
*Attorney, Agent, or Firm*—Fish & Richardson

[57] ABSTRACT

A method of treating water to kill bacteria therein includes exposing the water to a silver catalyst in the presence of oxygen to form an active oxidizer in the water. The silver catalyst includes elemental silver deposited on a high surface area alumina matrix. In one form of the method the active oxidizer formed is predominantly hydrogen peroxide, whereas in a second form of the method an oxidizable salt is added to the water so that the active oxidizer formed is predominantly oxidized ions of the salt. The method can be effectively carried out by adding oxygen in the form of $O_2$ ozone to the water prior to exposing it to the catalyst.

22 Claims, No Drawings

METHOD OF TREATING WATER

BACKGROUND AND SUMMARY OF THE INVENTION

The instant invention relates to methods of treating water and more particularly to an effective method of treating water to kill substantially all of the bacteria therein.

It is well recognized in most developed countries that water must be effectively treated to kill various micro-organisms therein, such as bacteria, before it can be utilized in municipal water systems. It is further generally recognized that water must be effectively treated before it can be utilized in swimming pools, hot tubs and spas, particularly when the pools, etc. are used by segments of the general public. In this regard, it is well recognized that bodies of water, such as swimming pools, hot tubs and spas are highly susceptible to rapid micro-organism growth and that they can rapidly become extremely hazardous to users thereof unless the water is effectively and continuously treated against micro-organisms.

It is also well known that the most common method of treating water against micro-organisms to render the water safe for human consumption and/or use in swimming pools, spas, etc. is to add chlorine (normally is the form of a hypochlorite salt or chlorine gas) to the water. However, it has been found that not only does chlorine have an objectionable odor, but that it can also cause skin irritations and serious eye irritations to users of pools, spas, etc.

Because of the objectionable physical properties of chlorine a number of alternate water treatment systems which operate without chlorine have been developed in recent years. One of the most effective types of alternative water treatment systems is a system in which silver ions are added to water to kill bacteria therein. In this regard, the applicant's prior U.S. Pat. No. 4,608,247 discloses an exemplary system of this general type. However, it has been found that in many cases systems of this type are only partially effective, and that often times reduced amounts of chlorine must nevertheless be added to water treated by such systems.

The instant invention provides an effective new method of treating water against micro-organisms including bacteria. More specifically, the instant invention provides an effective method of treating water to essentially instantaneously kill virtually all of the bacteria therein without the use of significant amounts of chlorine or other objectionable chemicals. Still more specifically, the instant invention provides an effective method of treating water by generating an active oxidizer in the water which is capable of attacking and killing a wide range of microorganisms therein. Even still more specifically, the instant invention provides a method of treating water comprising exposing the water to a silver catalyst in the presence of oxygen to form an active oxidizer in the water and, in some instances to also release silver ions therein via an erosion process similar to that set forth in the applicant's aforesaid prior U.S. patent. The water and the silver catalyst are, however, preferably maintained substantially free of compounds, such as activated charcoal or manganese dioxide, which would accelerate the degradation of the active oxidizer in the water. Accordingly, when an erosion buffer of the general type described in the applicant's aforesaid prior-U.S. patent is called for, a relatively inert material, such as PVC, is used rather than activated charcoal. The silver catalyst utilized in the method comprises an alumina matrix having between approximately 0.1% and 5% by weight of elemental silver chemically deposited thereon. The matrix has a surface area of at least approximately 50 $m^2/gm$ and the matrix with the silver thereon is heated to between approximately 300° C. and 1050° C. prior to use in the method. The oxygen utilized in the method preferably comprises ozone, although it can alternatively comprise $O_2$ which is present at a level of at least 2 ppm and at least 50% of the saturation level of the $O_2$ in the water. The silver catalyst is preferably heated to a temperature of at least approximately 750° C. prior to use in the method, and theoretically the elemental silver preferably includes at least 2% of silver crystals having crystal sizes between approximately 3 nanometers and 10 nanometers or crystal sizes in excess of 1000 nanometers. The water which is treated by method is preferably exposed to the silver catalyst at a rate of between 0.1 ml and 0.5 ml of water per minute per square meter of catalyst surface. In the basic form of the method the active oxidizer in the water comprises either elemental oxygen on the surface of the silver catalyst or hydrogen peroxide in the water. In a second form of the method, an oxidizable salt selected from a group consisting of a bromide, a chloride, an iodide, a metasulfate or a metaborate is added to the water. Accordingly, in the second form of the method oxidized ions of the salt are formed as an active oxidizer as the water is exposed to the silver catalyst.

It has been found that the method of the instant invention can be effectively utilized for treating water in order to kill various micro-organisms contained therein. Specifically, it has been found that virtually all bacteria contained in water treated by the method of the subject invention are instantaneously killed so that the water is immediately rendered safe for human consumption and/or for use in pools, spas, etc. It has been further found that when a low and unobjectionable level of a salt of the type specified is added to water prior to the treatment thereof by the method, the salt is converted to a safe and effective active oxidizer which is relatively stable under most conditions so that it has a prolonged beneficial effect with respect to maintaining the bacteria level in the treated water at a safe level.

Accordingly, it is a primary object of the instant invention to provide an effective method of treating water to kill micro-organisms, such as bacteria, therein.

Another object of the instant invention is to provide a method of treating water for pools, spas, etc. without the use of chlorine.

An even still further object of the instant invention is to provide a method of forming an effective active oxidizer in water which can kill most bacteria therein.

Other objects, features and advantages of the invention shall become apparent as the description thereof proceeds herein.

DESCRIPTION OF THE INVENTION

The subject invention has been found to provide an effective method for treating water to kill various micro-organisms contained therein, including bacteria. In this regard, it has been found that an active oxidizer formed in accordance with the subject invention can effectively attack and kill virtually all forins of bacteria in a water stream or a closed water system in order to render the water in the stream or system safe for human consumption and/or for use in pools, spas, etc. It has been further found that when the method includes the use of an active oxidizer comprising a low level of oxidized ions of a salt of a predetermined type, the method is capable of maintaining the level of micro-organisms contained in a body of water at an extremely low level for a prolonged period of time.

It has been found that in accordance with the method of the subject invention water can be effectively treated to kill substantially all of the bacteria contained therein by exposing the water to a silver catalyst in the presence of oxygen to forman active oxidizer in the water. Oxygen is preferably added to the water through a venturi immediately prior to exposing the water to the catalyst. Further, the entire system is preferably maintained free of compounds, such as activated charcoal or manganese dioxide which would accelerate the degradation of the active oxidizer in the water. When the method is carried out utilizing oxygen in the form of $O_2$ for treating water which does not contain one or more salts of a hereinafter specified type, the active oxidizer generated in the water normally comprises hydrogen peroxide, although it can also comprise trace quantities of elemental oxygen on the surface of the catalyst which may exist for extremely short periods of time. In any event, in this situation the main active oxidizer produced is hydrogen peroxide which has been found to be effective for oxidizing a wide range of microorganisms and for thereby rendering water bacteria free to an acceptable level. On the other hand, when the water contains a low level of ions of one or more of the oxidizable salts herein specified, the main active oxidizer generated in the water in accordance with the method comprises oxidized ions of the one or more salts.

The silver catalyst utilized in the method of the subject invention comprises elemental silver which has been chemically deposited on the surface of an alumina matrix. The alumina matrix preferably comprises Alcoa F1 activated alumina having a surface area of at least 50 $m^2$/gm, and more preferably between approximately 100 $m^2$/gm and 260 $m^2$/gm. The catalyst is preferably exposed to water of a rate of between 0.1 ml $H_2O$/minute/$m^2$ of catalyst surface area and 0.5 ml $H_2O$/minute/$m^2$ of catalyst surface area. The silver in the catalyst is preferably present in an amount between approximately 0.1% and 5% by weight of elemental silver., and it is preferably chemically deposited on the surface of the alumina matrix.

In addition to the above, it is essential that the silver catalyst utilized in the method of the subject invention be heated to a temperature of at least approximately 300° C. after deposition of the silver crystals on the alumina and prior to use of the catalyst for treating water. In this regard, it has been found that it is essential to heat the catalyst to at least approximately 300° C. to more effectively bond the silver to the alumina matrix. It has been further found that by heating the catalyst to between 750° C. and 1050° C. the crystalline structure of the alumina matrix can be converted from the Chi state to the Kappa state. It has been found that by converting the alumina crystals to the Kappa state the catalyst structure is transformed into a much more organized catalyst structure in which some of the silver on the alumina is actually protected in the interior of the matrix. It has been further found that this enables the catalyst to self-regenerate as additional silver crystals are exposed through erosion of the catalyst during prolonged use so that the effects of site poisoning due to contaminants in water being treated are minimized. Further, it has specifically been found that by heating the catalyst to approximately 875° C. an optimum alumina crystal rearrangement is achieved for enabling the catalyst to self-regenerate through erosion during prolonged use. In applications with high water flow rates it has also been found that it can be advantageous to add similar size particles of an inert buffer material, such as PVC, to the catalyst in order to control the erosion rate and to thereby extend the overall life of the catalyst.

In the preferred form of the method water is exposed to the silver catalyst in the presence of ozone rather than $O_2$. This is because it has been found that ozone is approximately 10 times as effective as $O_2$ for producing an active oxidizer in water. However, because ozone decays extremely rapidly in water, it is important that the water be exposed to the silver catalyst as soon as ozone has been added to the water. Ozone is preferably added to water through a venturi in an amount sufficient to produce a concentration of at least approximately 0.15 ppm of ozone in the water but at the very least 0.01 ppm of ozone when the water contacts the silver catalyst. This enables a sufficient amount of the oxygen from the ozone to combine with water to form hydrogen peroxide as an active oxidizer. Alternatively, when ions of an oxidizable salt of a type hereinafter specified are present in water the ozone normally reacts to produce oxidized salt ions as will hereinafter be more fully set forth.

While hydrogen peroxide formed in accordance with the method of the subject invention has been found to be an effective active oxidizer for killing bacteria in water, it is well known that hydrogen peroxide is somewhat unstable, particularly when it is exposed to ultraviolet light. Accordingly, it has been found that for some applications it can be advantageous to add a small quantity of an oxidizable salt to water before it is treated in accordance with the method. In this regard, it has been found that an oxidizable salt selected from a group consisting of bromides, ohiorides, iodides, metasulfates or metaborates can be effectively oxidized to form hypobromite ions, hypochlorite ions, hypoiodite ions, persulfate ions or perborate ions. It has been found that these oxidized salt ions are relatively stable under most conditions, and that they can nevertheless act as effective active oxidizers for killing most bacteria present in water. Further, once these oxidized salts have been utilized to oxidize or kill microorganisms, they are returned to their unoxidized states so that they can be regenerated by once again exposing them to a silver catalyst in the presence of oxygen ($O_2$ or $O_3$) to convert them back into active oxidizers as hereinabove set forth. Hence, it is possible to utilize the specified salts in extremely low concentrations, such as 50 ppm, which are unobjectionable in most applications.

EXAMPLE I

In a specific application of the method of the instant invention a silver catalyst was prepared from Alcoa F1 activated alumina. One Kilogram of the alumina was wet with 300 ml of deionized water containing 2.34 g of silver nitrate salt. The alumina with the silver nitrate salt thereon was then dried and the silver salt was reduced to elemental silver by placing the alumina with the silver nitrate salt thereon in a 5% solution of dextrose in water. The alumina with elemental silver thereon was then heated to approximately 1050° C. for approximately 2 hours. 500 gm of the catalyst which had approximately 2% by wt of silver thereon was then assembled in a 4 in. diameter by 6 in. long PVC canister and it was used to treat water from a 600 gallon Jacuzzi. The Jacuzzi was equipped with a filter and a filter pump which cycled 35 gpm of water from the spa through the filter. A 5 gpm slip stream was taken downstream of the filter and passed through the canister containing the silver catalyst. After passing through the silver catalyst canister the 5 gpm slip stream was returned to the remaining portions of the outlet from the filter and the combined 35 gpm stream was discharged back into Jacuzzi. At the start of the test the water in the Jacuzzi system was found to contain 0.01 mg/lt of silver ions and 0.05 mg/lt of copper ions. Further, at the start of the test both Enterococcus Hirae and Pseudomonas Aeruginosa bacteria were added to the spa so that the initial concentrations of both bacteria were greater than $3 \times 10^8$ CFU (colony forming units) per 100 ml of water. 50 ppm of sodium bromide was added to the Jacuzzi to serve as an oxidizable salt, and throughout the test ozone was added to the 5 gpm slip stream upstream of the silver catalyst canister via a venturi to provide an ozone concentration of 0.35 ppm at the silver catalyst canister. Samples of the water in the pool were taken every 2 minutes over the course of a 30 minute period, and sodium thiosulfate and disodium ethylenediamine tetraacetic acid was immediately added to each sample in order to neutralize the effects of the silver and the active oxidizers in the water. The appropriate dilutions specified were then made with sterile water. The samples were then cultivated for 48 hours, and thereafter bacteria counts were taken of the samples as listed below.

| Time Min. | dilution | pH | Temp. | Free Oxidizer (PPM Chlorine Equivalent) | Entero- coccus Hirae (CFU) | Pseudomonas Aeruginosa (CFU) |
| --- | --- | --- | --- | --- | --- | --- |
| 2 | 1:100 | 7.6 | 80 | 2.25 | <1 | <1 |
| 4 | 1:100 | 7.6 | 80 | 2.0 | <1 | <1 |
| 6 | 1:10 | 7.6 | 80 | 2.0 | <1 | <1 |
| 8 | 1;10 | 7.6 | 80 | 2.0 | <1 | <1 |
| 10 | 1:10 | 7.6 | 80 | 2.0 | <1 | <1 |
| 12 | 1:10 | 7.4 | 80 | 2.0 | <1 | <1 |
| 14 | None | 7.4 | 80 | 2.0 | <1 | <1 |
| 16 | None | 7.4 | 80 | 2.0 | <1 | <1 |
| 18 | None | 7.4 | 80 | 2.0 | <1 | <1 |
| 20 | None | 7.4 | 80 | 1.75 | <1 | <1 |
| 22 | None | 7.4 | 80 | 1.75 | <1 | <1 |
| 24 | None | 7.4 | 80 | 1.75 | <1 | <1 |
| 26 | None | 7.4 | 78 | 1.5 | <1 | <1 |
| 28 | None | 7.4 | 78 | 1.5 | <1 | <1 |
| 30 | None | 7.4 | 78 | 1.5 | <1 | <1 |

As will be seen, in each instance all test results of samples taken during the course of the method indicated less than 1 CFU per 100 ml of sample. Hence, it was concluded that the method had been effective for killing virtually all of the bacteria in the Jacuzzi within the first 2 minutes of operation and for maintaining a low bacteria level throughout the test.

EXAMPLE II

In a second procedure carried out in accordance with the method of the subject invention, water containing Escherichia Coli (E. Coli) bacteria was passed through a cartridge containing a silver catalyst prepared in accordance with the subject invention. The catalyst included an aluminum matrix with approximately 2% of elemental silver deposited on the surface thereof, and the catalyst had been previously heated to approximately 875° C. 500 g of the catalyst was contained in a PVC canister having a diameter of 4" and a length of 6". Water was passed through the catalyst at a rate of 4 gpm in a single pass study. In a first test the water entering the catalyst canister had an equilibrium ambient oxygen content of 4.1 ppm, and in a second test oxygen ($O_2$) was added to the water entering the cartridge to bring the oxygen ($O_2$) to saturation level. In a third test water having a depleted oxygen ($O_2$) level (less than 1 ppm) was passed through the canister. The test results are tabulated below.

| Oxygen level | Inlet | Outlet |
| --- | --- | --- |
| | E. Coli Bacteria level (CFU/100 ml) 1:100 sample Dilution | |
| Ambient Oxygen level in $H_2O$ (4.1 ppm $O_2$) @ 25° C. | 420 | 17 |
| Saturation Oxygen level in $H_2O$ @ 25° C. | 420 | 2 |
| Depleted Oxygen level in $H_2O$ (<1 ppm) @ 25° C. | 420 | 75 |
| | E. Coli Bacteria level (CFU/100 ml) 1:10,000 Dilution | |
| Ambien Oxygen Level in $H_2O$ (4.1 ppm $O_2$) @ 25° C. | 42 | 0 |
| Saturation Oxygen level in $H_2O$ @ 25° C. | 42 | 0 |
| Depleted Oxygen level in $H_2O$ (<1 ppm) @ 25° C. | 42 | 5 |

As will be seen, in each case the E. Coli level in the water leaving the canister was substantially reduced. However, the reduction in the E. Coli bacteria level was clearly dependent on the amount of oxygen present in the water entering the canister. In any event, it was clear that the method of the subject invention had been effective for killing a high percentage of the E. Coli bacteria present in the water entering the canister.

It is seen therefore that the instant invention provides an effective method for treating water to kill microorganisms, such as bacteria, contained therein. The method has been found to be effective for essentially instantaneously killing bacteria. Further, the method can be effectively carried out with a minimal level of oxidizable salt or without an oxidizable salt. Hence, it is seen that the method of the subject invention represents a significant improvement in the art relating to the treatment of water which has substantial commercial merit.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed:

1. A method of treating water to kill bacteria contained therein comprising exposing the water to a silver catalyst in the presence of oxygen to form an active oxidizer in the water, said silver catalyst comprising an aluminum matrix having elemental silver chemically deposited thereon, said matrix with said silver thereon having previously been heated to between approximately 750° C. and 1050° C.

2. In the method of claim 1, said oxygen comprising ozone.

3. In the method of claim 1, said oxygen comprising $O_2$ and being present in a concentration of at least 2 ppm and at least 50% of the saturation level of the $O_2$ in the water.

4. In the method of claim 1, said water being exposed to said silver catalyst at a rate of between 0.1 and 0.5 ml $H_2O$/minute/$m^2$ of catalyst surface area.

5. In the method of claim 1, said water and said catalyst being substantially free of components which accelerate the degradation of said active oxidizer.

6. In the method of claim 1, wherein said water is pool,, hot tub, or spa water.

7. In the method of claim 1, wherein said water is drinking water.

8. In the method of claim 1, said step of exposing said water to oxygen in the presence of said silver catalyst further comprising exposing said water to said silver catalyst in the presence of oxygen and a salt selected from a group consisting of a bromide, a chloride, an iodide, a metasulfate or a metasulfate or a metaborate in order to form oxidized ions of said salt in said water.

9. In the method of claim 8, said oxygen comprising $O_2$ and being present in a concentration of at least approximately 2 ppm and at least 50% of the saturation level of $O_2$ in the water.

10. In the method of claim 8, said oxygen comprising ozone.

11. In the method of claim 10, said ozone being present in a concentration of at least 0.01 ppm.

12. In the method of claim 10, said ozone being present in a concentration of at least 0.15 ppm.

13. In the method of claim 1, said matrix having between approximately 0.1% and 5% by weight of elemental silver chemically deposited thereon.

14. In the method of claim 1, said matrix having a surface area of at least approximately 50 $m_2$/gm.

15. In the method of claim 14, said matrix having between approximately 0.1% and 5% by weight of elemental silver chemically deposited thereon.

16. A method of treating water to kill bacteria contained therein comprising exposing the water to a silver catalyst in the presence of oxygen to form an active oxidizer in the water, said silver catalyst comprising an aluminum matrix having elemental silver chemically deposited thereon, said aluminum matrix having previously been heated to a sufficient temperature for a sufficient time to convert said aluminum matrix from the Chi state to the Kappa state.

17. In the method of claim 16, said step of exposing said water to oxygen in the presence of said silver catalyst further comprising exposing said water to said silver catalyst in the presence of oxygen and a salt selected from a group consisting of a bromide, a chloride, an iodide, a metasulfate or a metaborate in order to form oxidized ions.

18. In the method of claim 16, wherein said water is pool, hot tub, or spa water.

19. In the method of claim 16, wherein said water is drinking water.

20. In the method of claim 16, said matrix having between approximately 0.1% and 5% by weight of elemental silver chemically deposited thereon.

21. In the method of claim 16, said matrix having a surface area of at least approximately 50 $m^2$/gm.

22. In the method of claim 21, said matrix having between approximately 0.1% and 5% by weight of elemental silver chemically deposited thereon.

* * * * *

UNITED STATES PATENT AND TRADEMARK OFFICE
CERTIFICATE OF CORRECTION

PATENT NO.    : 5,352,369

DATED         : October 4, 1994

INVENTOR(S)   : Charles F. Heinig, Jr.

It is certified that error appears in the above-identified patent and that said Letters Patent is hereby corrected as shown below:

```
Column 2, line 67, "forins" should be --forms--.
Column 3, line 13, add a space between "form/an".
Column 3, line 48, delete "." after "silver".
Column 4, line 41, "ohiorides" should be --chlorides--.
```

Signed and Sealed this

Twentieth Day of February, 1996

Attest:

BRUCE LEHMAN

*Attesting Officer*    *Commissioner of Patents and Trademarks*